(12) United States Patent
Du et al.

(10) Patent No.: US 11,815,129 B2
(45) Date of Patent: Nov. 14, 2023

(54) NEEDLE ROLLER BEARING

(71) Applicant: Aktiebolaget SKF, Gothenburg (SE)

(72) Inventors: Shihao Du, Xi'an (CN); Thomas Kettner, Bamberg (DE); Harald Metz, Randersacker (DE); Sebastian Dinkel, Burglauer (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/564,271

(22) Filed: Dec. 29, 2021

(65) Prior Publication Data

US 2022/0213927 A1    Jul. 7, 2022

(30) Foreign Application Priority Data

Jan. 7, 2021   (CN) .......................... 202110016654.3

(51) Int. Cl.
  *F16C 19/46* (2006.01)
  *F16C 33/66* (2006.01)

(52) U.S. Cl.
  CPC .......... *F16C 19/46* (2013.01); *F16C 33/6696* (2013.01)

(58) Field of Classification Search
  CPC ...... F16C 19/46; F16C 33/56; F16C 33/6607; F16C 33/6611; F16C 33/664; F16C 33/6648; F16C 33/6696
  See application file for complete search history.

(56) References Cited

U.S. PATENT DOCUMENTS 7,234,873 B2 * 6/2007 Kato ....................... F16C 33/56
                                                      384/560

FOREIGN PATENT DOCUMENTS

| DE | 102013210526 | * 11/2014 |
| JP | 2009-85428 | * 4/2009 |
| WO | WO2013/182690 | * 12/2013 |
| WO | WO2019/214913 | * 11/2019 |

OTHER PUBLICATIONS

Translation of DE 102013210526 obtained Dec. 23, 2022.*

* cited by examiner

*Primary Examiner* — James Pilkington
(74) *Attorney, Agent, or Firm* — GARCIA-ZAMOR INTELLECTUAL PROPERTY LAW, LLC; Ruy Garcia-Zamor

(57) ABSTRACT

Disclosed is a needle roller bearing, in particular for use in supporting a bottom roller in a spinning machine. The needle roller bearing includes an inner ring and an outer ring which are arranged such that the inner ring and the outer ring are rotatable relatively to each other around a bearing rotation axis. A rolling chamber is defined between the inner ring and the outer ring, in which a plurality of needle rollers are arranged. A solid lubricant is disposed in the rolling chamber of the needle roller bearing.

9 Claims, 2 Drawing Sheets

NEEDLE ROLLER BEARING

CROSS-REFERENCE TO RELATED APPLICATIONS

This application claims priority to Chinese Patent Application no. 202110016654.3, filed Jan. 7, 2021, the contents of which is fully incorporated herein by reference.

FIELD OF THE INVENTION

The present invention relates to a needle roller bearing. In particular, the present invention relates to a needle roller bearing for use in spinning machines.

BACKGROUND OF THE INVENTION

Needle roller bearings are often used in the textile industry in different types of machines. Usually, the used machines include several needle roller bearings at different positions in the machine. Because of fibers particles, which can be released from the handled textiles, yarns, threads, etc. into the air, the environment, in which these roller bearings work, is rather harsh. In particular, the fiber particles in the air can easily enter the bearings and can cause bearing blockages and/or bearing failures.

In order to further reduce the number of bearing blockages and/or bearing failures, a frequent relubrication is generally used to replace the used lubricant and push out the accumulated fiber particles together with the used lubricant. Due to the arrangement of the bearings in the machine, it is often not possible to provide a central lubrication line such that the frequent relubrication needs to be performed manually at each of the bearings in order to replace the used lubricant. However, the procedure is both work and cost intensive and reduces the production rate.

Another known method of preventing foreign matter, such as fiber particles, from entering a bearing is sealing units. However, depending on the type of the used bearing and/or whether this bearing has flanges at its axial sides, there may not be enough space to accommodate a sealing unit. In addition, sealing units increase friction as well as the overall bearing costs.

It is therefore an object of the present invention to reduce an amount of contaminants such as fiber particles that can enter the needle roller bearing, without providing additional sealing units.

SUMMARY OF THE INVENTION

In the following a needle roller bearing, in particular for use in spinning machines, is provided, which comprises an inner ring and an outer ring which are arranged such that the inner ring and the outer ring are rotatable relatively to each other around a bearing rotation axis, wherein a rolling chamber is defined between the inner ring and the outer ring, in which a plurality of needle rollers is arranged. For example, the inner ring may be configured as a rotating ring whereas the outer ring may be configured as a stationary ring or vice versa. Furthermore, the needle roller bearing may comprise a cage that is configured to hold the needle rollers and space them apart.

In order to prevent particles, particularly fiber particles, from entering the needle roller bearing, a solid lubricant is disposed in the rolling chamber of the needle roller bearing. Thereby, the solid lubricant may act as a seal and makes it is less likely that particles, particularly fiber particles, enter the bearing which may increase a bearing's lifetime.

Furthermore, the inner ring and/or the outer ring may be provided with at least one flange at the axial sides of the inner ring and/or the outer ring to guide the needle rollers. Since the at least one flange usually covers an area that allows fiber entry into the bearing, the at least one flange also hinders fibers from entering. In addition, the at least one flange may be provided with at least one knurled surface to increase a sealing capacity provided by the at least one flange.

Preferably, the solid lubricant is configured to fill the rolling chamber in such a way that the needle rollers can rotate freely in the rolling chamber. In other words, the solid lubricant should not hinder a rotation of the bearing. The solid lubricant may be molded into the needle roller bearing such that it essentially covers the needle rollers while leaving very narrow openings or gaps to the needle rollers and raceways for allowing a free rotation of the needle roller bearing. Such a close osculation between the solid lubricant and the needle rollers and the raceways can significantly reduce the amount of contaminants accumulated in the bearing. Therefore, a maintenance effort for the needle roller bearing may be reduced.

According to another embodiment, the solid lubricant comprises a support material having a porous structure, wherein preferably the porous structure is saturated with a lubricant oil. Thereby, the lubricant may be retained by surface tension in the porous structure. For example, the porous structure of the solid lubricant may contain millions of pores having a size ranging from one micrometer to hundred micrometers, preferably from 1 μm to 50 μm, more preferably from 1 μm to 10 μm. The lubricant contained in the pores of the porous support material of the solid lubricant lubricates the bearing. Moreover, the support material may be made from a polymer material. Due to the contained lubricant oil an additional lubricating action can be omitted, which further reduces the effort and material costs for the maintenance of the needle roller bearing and allows for the solid lubricant to act not only as a lubricant supply for the bearing but also as a seal.

Preferably, the solid lubricant is configured to release the retained lubricant during an operation of the needle roller bearing. For example, the lubricant may be released due to a temperature change of the solid lubricant, for example if the solid lubricant is heated up due to the operation of the bearing. More particularly, if the support material of the solid lubricant slides against the rolling elements and/or raceways of the bearing, the rolling elements and/or raceways are coated with an even and consistent film of lubricant oil. A moderate increase in operating temperature can cause the lubricant oil to be pushed towards the surface of the support material.

Alternatively, or additionally, the contained lubricant may be released due to the motion of the bearing and/or due to a pumping action caused by the motion of the bearing. This may provide an effective minimum quantity lubrication. A minimum quantity lubrication is advantageous, firstly, because only a small amount of lubricant is needed to form the lubricant film that provides a proper bearing lubrication, which saves costs and reduces lubricant waste, and secondly, because the minimum quantity lubrication may also reduce a heat generation during bearing rotation.

According to a second aspect, a bottom roller bearing for supporting a bottom roller in a spinning machine is provided which comprises at least one previously described needle roller bearing. Preferably the inner ring of the needle roller bearing is configured as a rotating ring, which is mounted on the bottom roller, and the outer ring of the needle roller bearing is configured as a stationary ring. At least a bottom part of the outer ring may be configured to be received in a holding fixture provided at the spinning machine, and the bottom roller bearing may further comprise a fixation plate arranged on top of the outer ring and configured to fixate the needle roller bearing in the holding fixture. The fixation plate may comprise at least one nose that extends radially over the axial side of the bearing and abuts on the holding fixture such that the bottom roller bearing can be axially retained.

Usually, a spinning machine can include several bottom rollers that form segments of a rotating shaft, wherein the length of such a shaft assembled from the several bottom rollers can be over 30 meters long. At the beginning and the end of each bottom roller, the bottom roller is supported by a bottom roller bearing.

More particularly, the inner ring of the bottom roller bearing, which is a rotatable ring, is mounted onto the bottom roller. The stationary outer ring is fixed to the holding fixture provided at the spinning machine. The holding fixture may be configured in such a way that it only covers a bottom side (180°) of the outer ring. In particular, the fixation plate may also be configured in such a way that it only covers a part of the outer ring.

Further, the inner ring and/or the outer ring may include at least one flange at an axial side thereof to guide the needle rollers. Since the at least one flange usually covers an area that allows a fiber entry into the bearing, the at least one flange also hinders fibers from entering. In addition, the at least one flange may be provided with at least one knurled surface to increase a sealing capacity provided by the at least one flange. Also, the bottom roller bearing may be provided with a cage. The cage may be split so that the cage can be mounted over the inner ring flanges. This allows an easy dismounting and replacement of the cage.

BRIEF DESCRIPTION OF THE DRAWINGS

In the following, preferred embodiments of the invention are described in relation to the drawings, wherein the drawings are exemplarily only, and are not intended to limit the scope of protection. The scope of protection is defined by the accompanied claims, only.

The figures show.

In the following same or similar functioning elements are indicated with the same reference numerals.

DETAILED DESCRIPTION OF THE INVENTION

Figure 1:
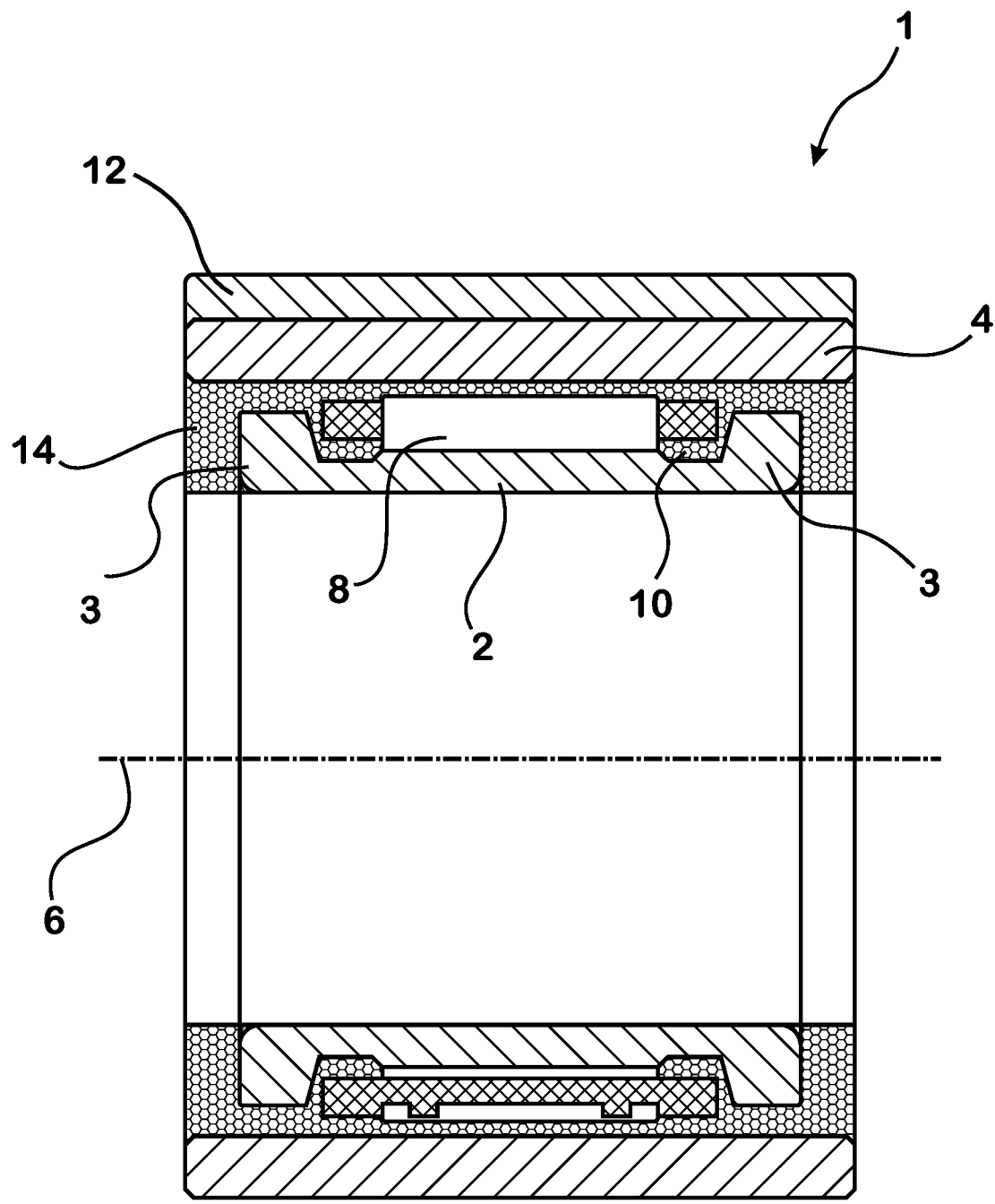
FIG. 1: a cross-section of a needle roller bearing according to an embodiment.

FIG. 1 shows a cross section of a needle roller bearing 1. The needle roller bearing 1 comprises an inner ring 2 and an outer ring 4. The inner ring 2 and the outer ring 4 are arranged concentrically to each other and in such a way that the inner ring 2 and the outer ring 4 are rotatable relatively to each other around a bearing rotation axis 6. In FIG. 1, the inner ring 2 is mounted as a rotatable inner ring onto a shaft, for example a bottom roller 22 (FIG. 2), whereas the outer ring 4 is fixed. Furthermore, the inner ring 2 has a flange 3 at each axial side. The flange 3 of the inner ring 2 may have a first lateral side and second lateral side. The inner ring may further comprise at least one outermost lateral face.

The needle roller bearing 1 includes a plurality of needle rollers 8, which are disposed in a rolling chamber being defined between the inner ring 2 and the outer ring 4. The needle rollers 8 are configured to roll on raceways (not referenced) that are provided on both the inner ring 2 and the outer ring 4. Additionally, the needle rollers 8 of the needle roller bearing are held by a cage 10. The cage 10 is configured as a split cage so that the cage 10 can be mounted over the inner ring flanges 3. Furthermore, a fixation plate 12 is provided at the outer ring 4 which allows for an axial fixation of the bearing.

To prevent particles, particularly fiber particles, from entering the needle roller bearing 1, a solid lubricant 14 is disposed in the rolling chamber of the needle roller bearing 1. The solid lubricant 14 fills the whole rolling chamber in such a way that it essentially covers the needle rollers 8 and the cage 10. The solid lubricant 14 may extend over the first lateral side and the second lateral side of the inner ring 2. In some embodiments, the solid lubricant 14 may contact at least one outmost lateral face of the inner ring 2. For allowing a free rotation of the needle roller bearing 1, very narrow openings or gaps are left between the needle rollers 8 and raceways on which the needle rollers 8 are rolling.

The solid lubricant 14 according to the embodiment shown in FIG. 1 is made from a polymer material which acts as a support material and has a porous structure, which is saturated with a lubricant oil. The lubricant oil is retained by surface tension in the porous structure of the solid lubricant 14. Due to the rotation of the needle roller bearing 1 during operation, the contained lubricant is released and can provide an effective minimum quantity lubrication for the needle roller bearing 1.

Figure 2:
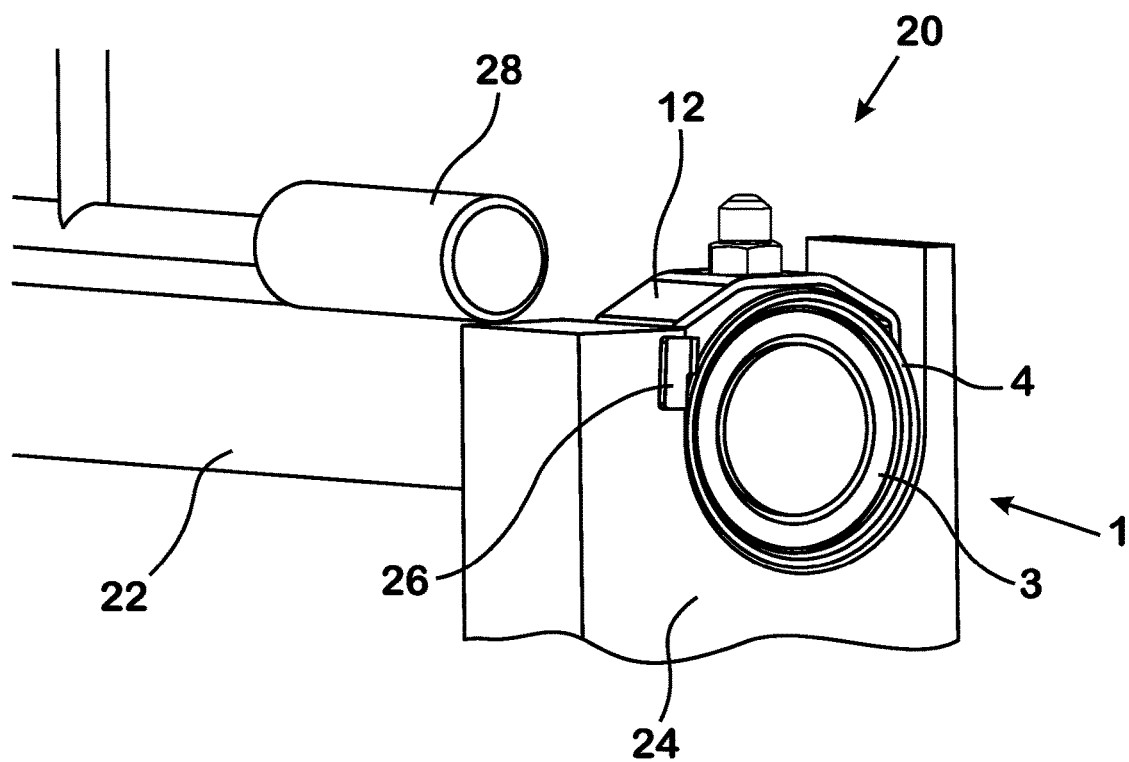
FIG. 2: a schematic view of a bottom roller bearing according to another embodiment.

In FIG. 2, a bottom roller bearing 20 is shown that is supporting a bottom roller 22 that is for example arranged in a spinning machine. The bottom roller bearing 20 includes a needle roller bearing 1 as shown in FIG. 1. The bottom roller 22 is mounted on the inner ring 2 of the needle roller bearing 1, which is configured as a rotating ring. Furthermore, the inner ring 2 has flanges 3 on both axial sides of the bearing 1 in order to prevent entry of fibers in the bearing and protect it from damage.

The outer ring 4 of the needle roller bearing 1 is configured as a stationary ring. A bottom part of the outer ring 4 seated in a holding fixture 24 of the spinning machine. The holding fixture 24 of FIG. 2 covers the bottom part (approx. 180°) of the outer ring 4 and retains the bearing radially. Since the bottom rollers 22 are pressed down by a top roller 28 during operation of the spinning machine, an upward fixation of the bottom roller bearing 20 is not needed.

The fixation plate 12, which also covers only a part of the outer ring 4 provides an axial fixation. In the embodiment shown in FIG. 2, this is achieved with noses 26 (only one is shown) that extend radially over the axial side of the bearing and abut on an axial outer side of the holding fixture 24.

In summary a close osculation between the solid lubricant 14 and the needle rollers 8 and the raceways can significantly reduce the amount of contaminants that are accumulated in the needle roller bearing 1 as the solid lubricant also acts as a seal. Furthermore, lubricant oil that is retained in the solid lubricant 14 may make a relubrication of the needle roller bearing 1 unnecessary. This further reduces the effort and material cost for the maintenance of the needle roller bearing 1 and allows for almost maintenance free needle roller bearing 1.

The invention claimed is:

1. A needle roller bearing for use in supporting a bottom roller in a spinning machine, the needle roller bearing comprising:
   an inner ring and an outer ring configured such that the inner ring and the outer ring are rotatable relatively to each other around a bearing rotation axis, wherein
   a rolling chamber is defined between the inner ring and the outer ring, in which a plurality of needle rollers is arranged, and
   a solid lubricant is disposed in the rolling chamber of the needle roller bearing, the solid lubricant comprising a porous structure, the porous structure comprising pores having a pore size ranging from 1-10 μm,
   the inner ring further comprises an outermost lateral face and the solid lubricant contacts the outermost lateral face.

2. The needle roller bearing according to claim 1, wherein the solid lubricant is configured to fill the rolling chamber in such a way that the needle rollers can rotate freely in the rolling chamber.

3. The needle roller bearing according to claim 1, wherein the solid lubricant comprises a support material, the support material comprising the porous structure.

4. The needle roller bearing according to claim 3, wherein the porous structure is saturated with a lubricant oil.

5. The needle roller bearing according to claim 4, wherein the solid lubricant is configured to release the retained lubricant oil during an operation of the needle roller bearing.

6. The needle roller bearing according to claim 3, wherein the support material is made from a polymer material.

7. The needle roller bearing according to claim 1, wherein each of the plurality of needle rollers are space apart from each other by a cage.

8. A bottom roller bearing for supporting a bottom roller in a spinning machine, the bottom roller bearing comprising:
   at least one needle roller bearing including an inner ring and an outer ring configured such that the inner ring and the outer ring are rotatable relatively to each other around a bearing rotation axis, the inner ring comprising a first lateral side and a second lateral side, wherein
   a rolling chamber is defined between the inner ring and the outer ring, in which a plurality of needle rollers is arranged, and
   a solid lubricant is disposed in the rolling chamber of the needle roller bearing, the solid lubricant extending over the first lateral side and the second lateral side,
   the inner ring further comprises an outermost lateral face and the solid lubricant contacts the outermost lateral face.

9. A needle roller bearing for use in supporting a bottom roller in a spinning machine, the needle roller bearing comprising:
   an inner ring and an outer ring configured such that the inner ring and the outer ring are rotatable relatively to each other around a bearing rotation axis, the inner ring having an inner axial length, the outer ring having an outer axial length, the inner axial length being shorter than the outer axial length, wherein
   a rolling chamber is defined between the inner ring and the outer ring, in which a plurality of needle rollers is arranged, and
   a solid lubricant is disposed in the rolling chamber of the needle roller bearing, the solid lubricant comprising a porous structure, the porous structure comprising pores having a pore size ranging from 1-10 μm,
   the inner ring further comprises an outermost lateral face and the solid lubricant contacts the outermost lateral face.

* * * * *